(12) United States Patent
Mueller (10) Patent No.: US 11,964,827 B2
(45) Date of Patent: Apr. 23, 2024

(54) DEVICE AND METHOD FOR PROVIDING A PRODUCT STREAM WITH MUTUALLY ALIGNED FOOD PRODUCTS ON PRODUCT SUBSTRATES

(71) Applicant: Albert Handtmann Maschinenfabrik GmbH & Co. KG, Biberach (DE)

(72) Inventor: Stefan Mueller, Hohentengen (DE)

(73) Assignee: ALBERT HANDTMANN MASCHINENFABRIK GMBH & CO. KG, Biberach (DE)

(*) Notice: Subject to any disclaimer, the term of this patent is extended or adjusted under 35 U.S.C. 154(b) by 0 days.

(21) Appl. No.: 17/932,236

(22) Filed: Sep. 14, 2022

(65) Prior Publication Data
US 2023/0090630 A1    Mar. 23, 2023

(30) Foreign Application Priority Data

Sep. 17, 2021   (EP) .................................... 21197418

(51) Int. Cl.
B65G 47/31    (2006.01)
B65G 47/64    (2006.01)

(52) U.S. Cl.
CPC ........... *B65G 47/31* (2013.01); *B65G 47/648* (2013.01); *B65G 2201/0202* (2013.01); *B65G 2203/0233* (2013.01); *B65G 2203/0283* (2013.01); *B65G 2203/0291* (2013.01); *B65G 2203/042* (2013.01)

(58) Field of Classification Search
CPC ................ B65G 47/31; B65G 47/648; B65G 2201/0202

USPC ......................................... 198/349, 578, 587
See application file for complete search history.

(56) References Cited

U.S. PATENT DOCUMENTS

| | | | |
|---|---|---|---|
| 2,442,250 A | 5/1948 | Spain | |
| 3,051,581 A | 8/1962 | Bonami | |
| 3,269,082 A | 8/1966 | Bonami | |
| 3,870,139 A | 3/1975 | Wagner | |
| 3,915,282 A * | 10/1975 | Remensperger | A21C 9/085 198/456 |
| 3,982,625 A * | 9/1976 | Wentz | B65G 47/50 198/572 |
| 4,244,461 A * | 1/1981 | Fischer | B65H 29/58 198/456 |

(Continued)

FOREIGN PATENT DOCUMENTS

| | | |
|---|---|---|
| DE | 202010011406 U1 | 11/2011 |
| JP | S62153016 A | 7/1987 |

*Primary Examiner* — Douglas A Hess
(74) *Attorney, Agent, or Firm* — McCoy Russell LLP (57) ABSTRACT

A device and a method for providing a product stream with mutually aligned food products on product substrates are described According thereto, a first conveyor belt for the supply transport and mutual transverse alignment of the food products to each other, a second conveyor belt that adjoins in the direction of transport at a gap-shaped belt transition and can be controlled separately for the discharge transport and mutual longitudinal alignment of the food products to each other, and a substrate placement device for supplying the product substrates from below through the belt transition in front of/under the food products that are respectively transported across the belt transition. This enables the alignment and substrate placement in a particularly compact and reliable configuration at a single belt transition.

17 Claims, 3 Drawing Sheets

(56) References Cited

U.S. PATENT DOCUMENTS

| | | | |
|---|---|---|---|
| 4,421,222 A | 12/1983 | Stuermer | |
| 4,846,336 A * | 7/1989 | Hoyland | B65G 47/084 198/432 |
| 6,152,284 A * | 11/2000 | Sandberg | B65G 47/647 198/432 |
| 7,360,348 B2 * | 4/2008 | Ishii | B65B 57/14 53/493 |
| 8,636,137 B2 * | 1/2014 | Weber | B65G 47/24 198/572 |
| 8,955,664 B2 * | 2/2015 | Lim | B65G 47/648 198/370.1 |
| 9,180,990 B2 * | 11/2015 | Rother | B65B 43/14 |
| 9,265,261 B2 * | 2/2016 | Haas | B65G 39/16 |
| 9,309,059 B2 * | 4/2016 | Corallo | B65G 43/08 |
| 11,064,705 B2 * | 7/2021 | Van Blokland | B65G 47/68 |
| 11,685,608 B2 * | 6/2023 | Schröder | B65G 47/26 198/457.03 |
| 2008/0173519 A1 | 7/2008 | Ely | |
| 2014/0126986 A1 | 5/2014 | Corallo et al. | |
| 2016/0297618 A1 | 10/2016 | Beesley | |

\* cited by examiner

DEVICE AND METHOD FOR PROVIDING A PRODUCT STREAM WITH MUTUALLY ALIGNED FOOD PRODUCTS ON PRODUCT SUBSTRATES

CROSS-REFERENCE TO RELATED APPLICATION

The present application claims priority to European Patent Application No. 21197418.3 filed on Sep. 17, 2021. The entire contents of the above-listed application are hereby incorporated by reference for all purposes.

TECHNICAL FIELD

The disclosure relates to a device and method for providing a product stream with mutually aligned food products on product substrates.

BACKGROUND

The production of food products, in particular fresh products such as burger patties, portions of minced meat or cream cheese, is known to be possible on production lines with several machines, possibly lined up by way of conveyor belts, at the end of which there is a packaging machine or an onward processing belt. Such food products often have to be handled lying on the conveyor belts. This is due to the shape and consistency of the food products. Prior to processing, such as frying, deep-frying, or deep-freezing, the food products typically have a comparatively soft and yielding consistency, i.e. they are not inherently dimensionally stable during handling, but can be plastically deformed.

Due to these product properties and the required placement of the food products onto the conveyor belts, their placement positions transverse to the direction of transport can vary so greatly that this needs to be corrected prior to further processing in order to create sufficiently uniform transverse alignment. The mutual alignment of the food products in the longitudinal direction, i.e. the transport spacings between them, can vary so greatly that automated further processing is impeded or is not possible without correcting the transport spacings. Such correction is known to be possible by lining up conveyor belts having variable transport speeds.

SUMMARY

A fundamental challenge when handling food products described is the reliable transfer of the food products from one conveyor belt onto the next. For this purpose, both the respective properties of the food product as well as device features such as the diameter of the deflection rollers at the beginning and the end of the conveyor belts, the respective safety distance between the conveyor belts, the alignment of the conveyor belts relative to one another, and any speed differences possibly existing between the successive conveyor belts must be taken into account. Belt transitions are therefore a potential source of fault for the production process.

On the other hand, certain process steps require associated belt transitions, such as aligning the food products on the conveyor belts and supplying sheet-shaped product substrates, such as carrier paper, for the individual products.

Figure 2:
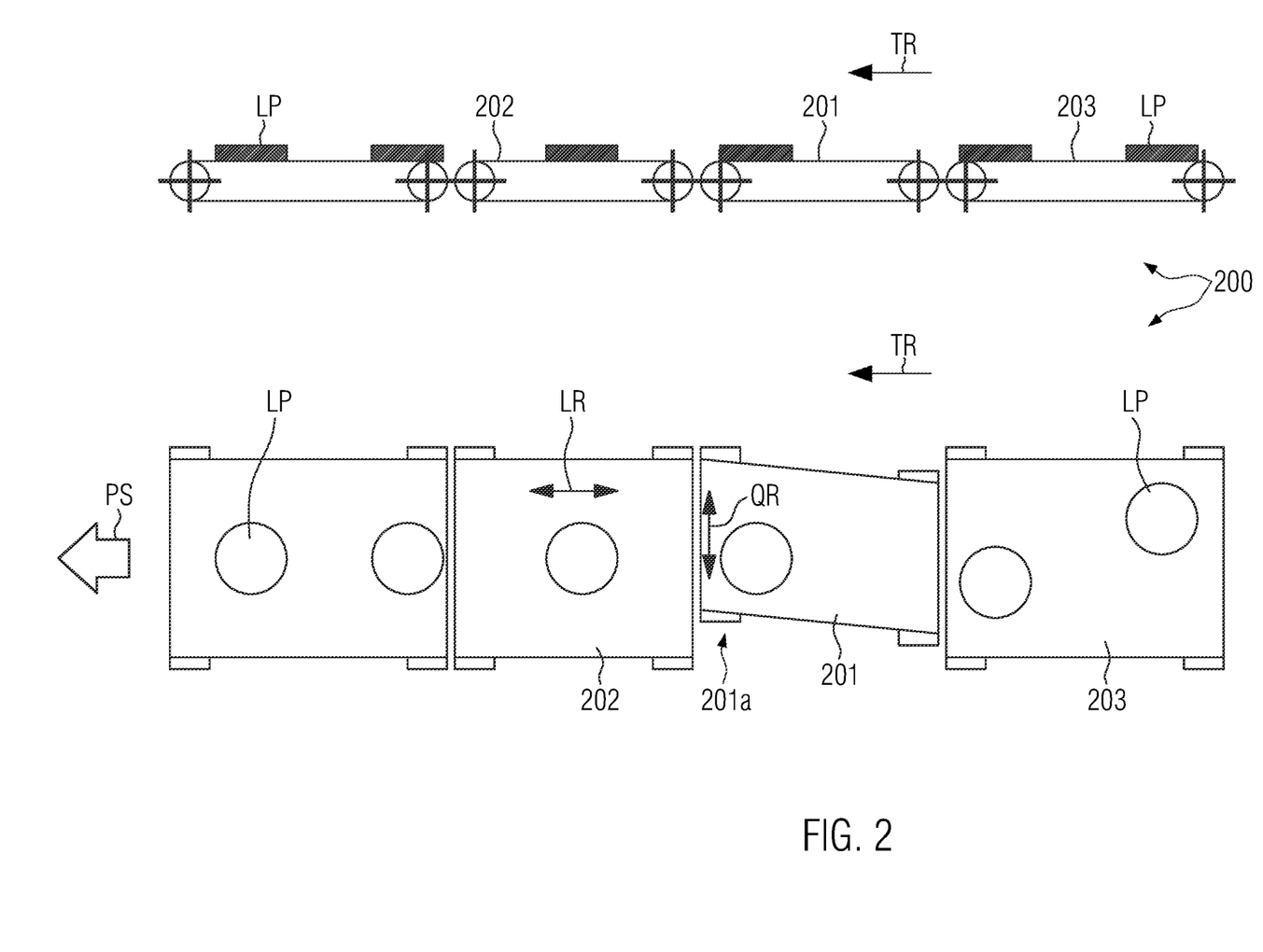
FIG. 2 shows an alignment device known from prior art in a schematic side view and a top view.

For example, a device 200 for aligning food products LP in transverse direction QR with respect to a direction of transport TR and in a longitudinal direction LR parallel thereto, is shown by way of example and illustrated schematically in FIG. 2. For this purpose, device 200 comprises at least one first conveyor belt 201, the deflection roller of which on the outlet side can be adjusted in transverse direction QR, and an adjoining second conveyor belt 202, the transport speed of which can be varied. For this purpose, end 201a of first conveyor belt 201 on the outlet side is adjusted individually for each food product LP such that a product stream PS with food products LP that are aligned substantially identically in the transverse direction QR arises therefrom, as indicated in FIG. 2. In addition, the transport speed of second conveyor belt 202 for individual food products LP is varied in such a way that food products LP in the resulting product stream PS have substantially identical transport spacings. As is known, it is necessary in this regard to detect the individual transverse positions and longitudinal positions of food products LP upstream (not shown), for example, by imaging, on an upstream conveyor belt 203.

Figure 3:
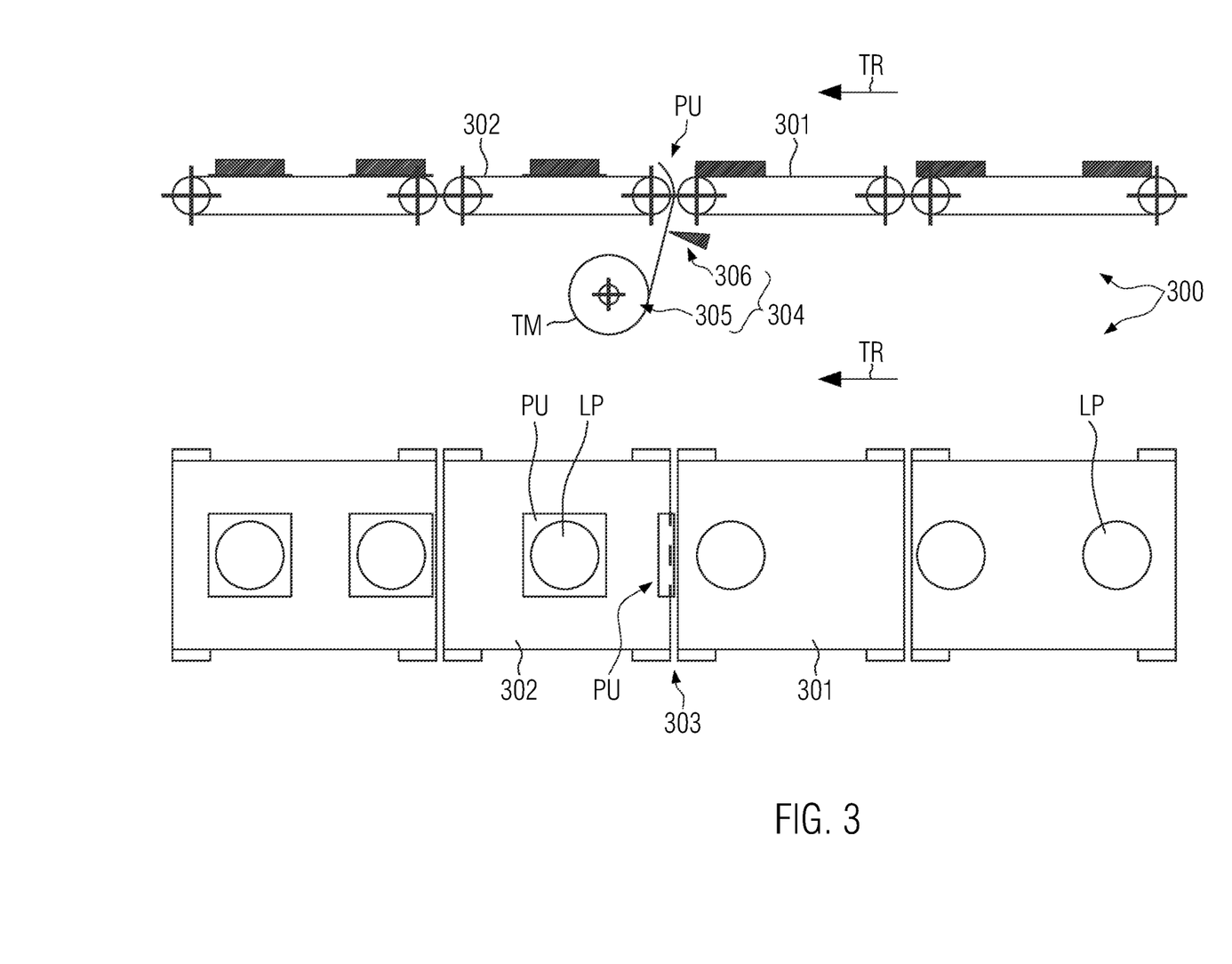
FIG. 3 shows a substrate placement device known from prior art in a schematic side view and a top view.

A device 300, shown schematically and by way of example in FIG. 3, for supplying sheet-like product substrates PU through a belt transition 303 formed between a first conveyor belt 301 and an adjoining second conveyor belt 302, is also known. For this purpose, device 300 comprises a substrate placement device 304 with a draw-off device 305 for drawing off a strip-shaped carrier material TM and with a separating unit 306 for separating product substrate PU by successively severing it from strip-shaped substrate material TM. The individual product substrates PU are supplied from below synchronously at the transport speed of food products LP directly in front of the latter, so that each food product LP runs onto a product substrate PU and is transported away thereon by second conveyor belt 302.

A drawback of devices 200, 300 described and the methods carried out therewith is that a plurality of conveyor belts 201, 202, 301, 302 as well as conveyor belts disposed possibly upstream, in between and/or downstream are required to carry out the respective process steps. In addition to undesirably high equipment complexity and space requirements, this causes the problem that the many belt transitions are a potential source of faults and may have to be adapted to different food products LP and/or that certain food products LP cannot be handled reliably.

There is therefore a need for improved devices and methods for providing a product stream in which the individual food products are mutually aligned suitably both in the transverse direction as well as in the longitudinal direction, and in which the food products can be further processed on sheet-like product substrates.

The device according to the disclosure is used for providing a product stream consisting substantially of mutually aligned food products on product substrates. For this purpose, the device comprises a first conveyor belt for the supply transport and mutual transverse alignment of the food products to each other, a second conveyor belt that adjoins in the direction of transport at a gap-shaped belt transition and can be controlled separately at a variable speed for the discharge transport and mutual longitudinal alignment of the food products to each other, and a substrate placement device for supplying the product substrates from below through the belt transition in front of/under the food products that are respectively transported across the belt transition. The conveyor belt speed of the first conveyor belt can also be configured to be variable and controllable independently of the second conveyor belt.

To align the food products and to provide the food products on product substrates, only a single belt transition and the substrate placement device associated with the belt transition are therefore required. In this way, equipment complexity, space requirements, and the overall number of belt transitions required, and therefore their potential for interference, can be minimized.

The food products have in particular a plastically deformable consistency. Plastic deformation is possible, for example, due the effect of the food products' own weight in that their shape adapts, for example, to a bearing surface or shape. The food products are in particular fresh portioned products such as meat products, dairy products, or pasta.

The product substrates are to be understood to be sheet-like carrier material, in particular made of paper, film, or nonwoven fabric or composite material made of at least two such materials. The product substrates are used, for example, as a base and/or intermediate layer for the food products when they are placed next to one another, shingled, and/or stacked on top of one another in a packaging.

The gap-shaped belt transition is formed by at least one deflection roller of the first conveyor belt on the outlet side and at least one deflection roller of the adjoining second conveyor belt on the inlet side with a gap disposed therebetween.

By definition, the transverse alignment takes place in a lateral transverse direction that is substantially orthogonal to the direction of transport, and the longitudinal alignment in a longitudinal direction that is parallel to the direction of transport.

The end of the first conveyor belt on the outlet side can be adjusted mechanically/by motor transverse to the direction of transport to different lateral alignment positions in order to align the food products individually with respect to the substrate placement device and the product substrates provided. It is also possible to move the end (the beginning) of the first conveyor belt on the inlet side or both ends of the conveyor belt to different lateral alignment positions by way of a motor.

For this purpose, the device comprises at least one actuator with which at least the end of the first conveyor belt on the outlet side can be moved transverse to the direction of transport to the different alignment positions, for example, by lateral horizontal displacement. The beginning (the end on the inlet side) of the first conveyor belt can be arranged in a position that is fixed laterally, i.e. transverse to the direction of transport. A transverse offset of the individual food products at the beginning of the first conveyor belt or immediately upstream thereof with respect to a target transport path can therefore be reduced to a permissible deviation or eliminated at the end of the first conveyor belt on the outlet side.

With a single associated actuator, the first conveyor belt could be displaced overall in the transverse direction to the alignment positions. With separate actuators for the ends of the first conveyor belt on the inlet and outlet sides, they could be displaced in a particularly variable manner both in terms of location and time for the transverse alignment of the food products. A maximum relative transverse offset between the ends on the inlet and outlet sides could also be adapted in a controlled manner to the respective transverse elasticity of the first conveyor belt. For example, the end on the inlet side could be offset transversely to a lesser extent than the end on the outlet side.

The transverse offset on the inlet side can be determined by sensors at the beginning of the first conveyor belt or upstream thereof, for example, by imaging.

The device may comprise an electronic control device which is configured to adjust the end on the inlet side and/or the outlet side to the respective lateral alignment position when the first conveyor belt is running, before the respective food product touches the product substrates associated therewith and/or the second conveyor belt. As a result, the food product twisting and/or undesired displacement of the food product with respect to the associated product substrates can be prevented.

The control device may be configured to maintain the lateral alignment positions on the outlet side at least until the food product which has each been aligned thereby has left the first conveyor belt entirely. This also promotes correct positioning of the food product on the respective product substrate.

The control device may be configured to change the transport speeds of the first and/or the second conveyor belt for the longitudinal alignment of the food products when the food product has been received entirely, in terms of transport, by the second conveyor belt from the first conveyor belt and/or by way of the associated product substrate, and/or when the respectively associated product substrate is present in separated form. The common longitudinal alignment of the food product and the product substrate is then possible in a manner decoupled from the advancement of the product substrate, in particular immediately after the above condition has been met, in order to enable the most far-reaching equalization of transport spacings possible.

The food products have been received entirely in terms of transport as soon as they are no longer resting on the conveyor belt/transport device that is respectively immediately upstream, i.e. have entirely left the latter. It presently goes without saying that the food products are then already predominantly lying on the receiving conveyor belt, i.e. the geometric center of gravity of the food products is then above the receiving conveyor belt.

The product substrates may be separated by being successively severed from a strip-shaped carrier material, but could in principle also be provided in a separated form stacked in a magazine present at the substrate placement device.

The control device can be configured to determine the transport speeds and/or to temporarily match the speed profiles of the first and the second conveyor belt as well as of the advancement of the product substrates for their supply in front of/under the food products. This means that the first and the second conveyor belt as well as the substrate placement device then temporarily operate at identical transport and advancement speeds for each individual supply and substrate placement. This enables the precise and reliable supply of the product substrates in front of and under the respective food product.

The substrate placement device may be configured to separate the product substrates from a strip-shaped carrier material, and the advancement speed of the substrate placement device can be adapted to the transport speed of the first and/or the second conveyor belt, in particular for severing the product substrates as long as the respectively associated food products are not yet resting entirely on the second conveyor belt. As a result, the length (dimension in the direction of transport) of the product substrates can be adapted to the respective food products and created in a reproducible manner.

The advancement speed can deviate at least temporarily from the transport speed upstream and/or downstream. For example, the advancement of the carrier material for separating/severing the product substrate can be briefly interrupted or decelerated. In principle, the length of the product substrate can be adjusted variably, for example, also in such a way that two food products can be placed onto a correspondingly long product substrate, or that the product substrate can be folded over the food product in order to place another food product on top of it.

The method according to the disclosure is used to provide a product stream composed of mutually aligned food products, in particular having a plastically deformable consistency, on product substrates. For this purpose, the food products are transported in on a first conveyor belt and aligned with one another in the transverse direction due to its mechanical adjustment. Furthermore, the product substrates are supplied from below at the end of the first conveyor belt at the outlet side and the food products are received and transported away in particular individually by way of the supplied product substrates by a second conveyor belt adjoining in the direction of transport. The food products are mutually aligned in the longitudinal direction by adjusting the speed of the second conveyor belt, in particular relative to the first conveyor belt, and in particular a transport spacing between the food products is equalized. The transport speed of the first conveyor belt can also be adjusted/varied in order to support the uniformity of the transport spacing between the individual products on the outlet side.

The food products may be aligned in an automated manner during their transport by the mechanical adjustment of the end of the first conveyor belt on the outlet side transverse to the direction of transport to individual lateral alignment positions with respect to the product substrates supplied, in each case before the food products touch the product substrates and/or the second conveyor belt. In contrast, the beginning (the end on the inlet side) of the first conveyor belt does not necessarily have to be adjusted in the transverse direction, although this is possible in principle by way of a common or separate actuator. A transverse offset between the individual food products at the beginning of the belt can then be eliminated or at least minimized by moving to the individual alignment positions at the end of the belt in a selective manner.

The alignment positions of the end of the first conveyor belt on the outlet side that are individually assumed for the individual food products may be maintained at least until the associated food product has left the first conveyor belt entirely. This promotes correct positioning of the product substrates and the food products relative to one another.

The transport speeds of the first and/or the second conveyor belt for the longitudinal alignment (spacing adjustment) of the food products relative to one another may be adjusted mechanically when and in particular as soon as the respective food product has been received entirely, in terms of transport, by the first conveyor belt and/or by way of the associated product substrate by the second conveyor belt, and/or the associated product substrate is present in a separated manner. In particular, when the spacing is adjusted, the food products rest predominantly and in particular entirely on the conveyor belt respectively used for the spacing adjustment, possibly by way of the associated product substrates.

The speeds and/or speed profiles of the first and the second conveyor belt and the advancement speed of the product substrates can be temporarily matched to one another/synchronized with one another for their supply.

In some embodiments, the product substrates are individually separated from a strip-shaped carrier material below the first and/or the second conveyor belt and adjusted to their transport speed, for example, temporarily in a speed-synchronous manner therewith. The product substrates are then each guided from below to in front of the associated food product through a belt transition formed between the first and the second conveyor belt, so that the former at the beginning of the second conveyor belt runs onto the product substrate and is aligned therewith on the second conveyor belt in the longitudinal direction and transported away. The speed-synchronous supply of the product substrates can promote precise dimensioning and positioning of the product substrates in the direction of transport and their reliable transport with the incoming food products. Separation is also possible without simultaneous speed synchronization, for example, during a temporary interruption of the belt advancement (of the carrier material).

The product substrates may be severed from the strip-shaped carrier material before the associated food product rests entirely on the second conveyor belt.

Transverse offsets and transport spacings of the food products on the inlet side to be corrected may be detected by sensors upstream of the first conveyor belt and/or at its beginning (end on the inlet side) and compensated for or equalized by way of the first and the second conveyor belt. A transverse offset between the individual food products determined in this manner can then be corrected in an automated manner by the transverse adjustment of the end (on the inlet and/or outlet side) of the first conveyor belt, as can a longitudinal offset determined in this manner or unequal transport spacings of the food products from one another by compensating speed adjustment of the second conveyor belt and optionally of the first conveyor belt.

The method may be carried out with a consistently continuous transport motion of the food products. The device may be configured for the transverse alignment and the longitudinal alignment of the food products and for the supply of the product substrates each during such a continuous transport.

BRIEF DESCRIPTION OF THE FIGURES

An embodiment of the disclosure is illustrated by drawings, where.

DETAILED DESCRIPTION

Figure 1:
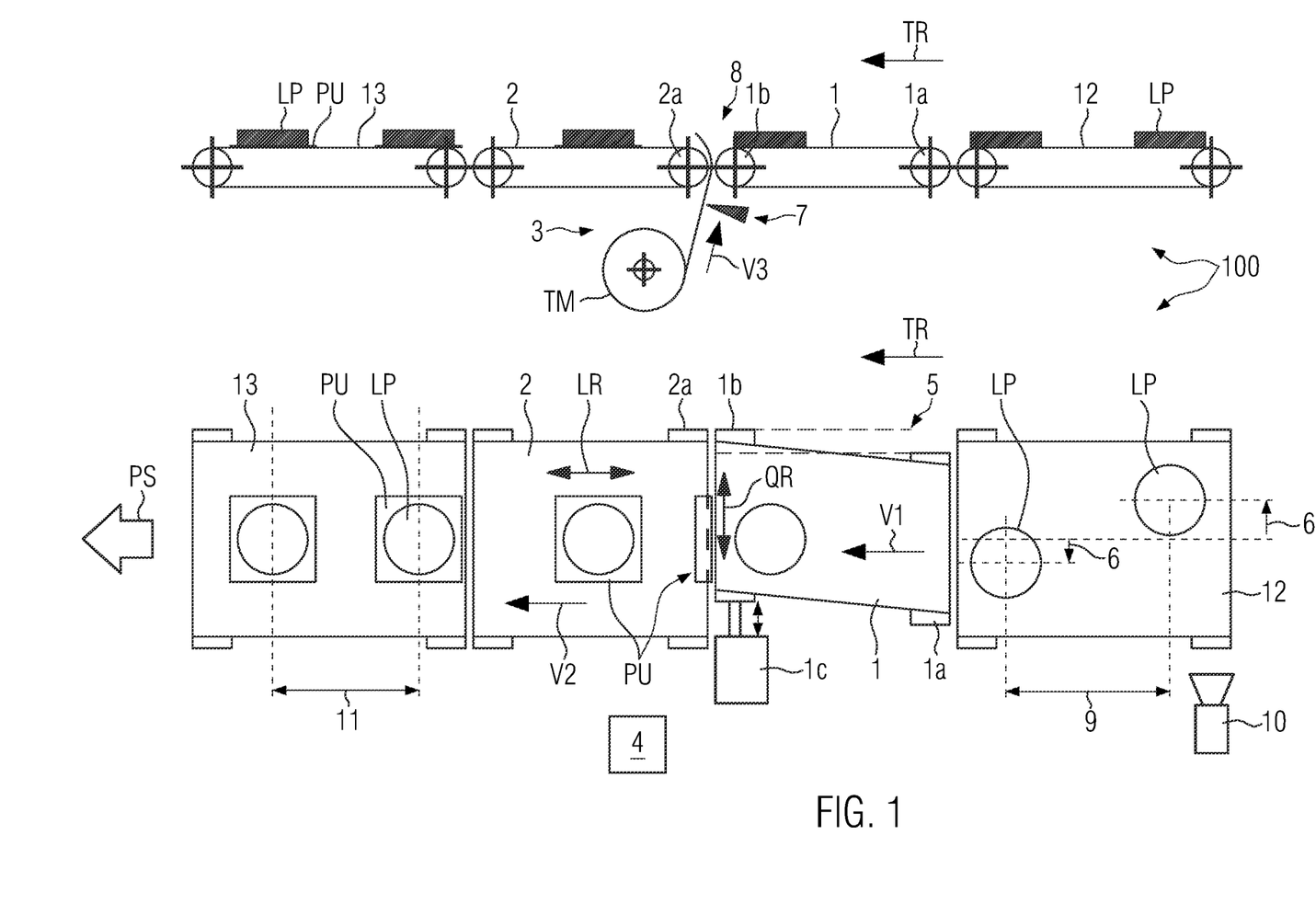
FIG. 1 shows a device according to the disclosure in a schematic side view and a top view.

As can be seen in FIG. 1, device 100 according to the disclosure for providing a product stream PS composed of mutually aligned food products LP on product substrates PU according to an embodiment comprises: a first conveyor belt 1 for the supply transport of food products LP at a first transport speed V1, which may be variable, and for the alignment food of products LP in transverse direction QR relative to one another; a second conveyor belt 2 which adjoins in direction of transport TR and is driven separately at a variable second transport speed V2 for aligning food products LP with one another in longitudinal direction LR as well as for transporting away food products LP on product substrates PU; and a substrate placement device 3 for supplying product substrates PU between first and second conveyor belt 1, 2 each in front of/below food products LP transported in by first conveyor belt 1 and aligned in transverse direction QR.

The beginning (the end on the inlet side) of first conveyor belt 1 is formed by a deflection roller 1a on the inlet side which is arranged to be stationary in transverse direction QR or optionally to be laterally movable, and the end (on the outlet side) of first conveyor belt 1 is formed by a deflection roller 1b on the outlet side which can be displaced substantially horizontally in transverse direction QR by a motor.

Deflection roller 1b on the outlet side and optionally also deflection roller 1a on the inlet side can be adjusted in transverse direction QR by way of at least one actuator 1c (only indicated schematically). For example, a separate actuator 1c (not shown) can be correspondingly associated to deflection roller 1a on the inlet side. A common actuator 1c for both deflection rollers 1a, 1b (not shown) is also conceivable, for example, for displacing first conveyor belt 1 together in transverse direction QR.

Device 100 comprises an electronic control device 4 for controlling/regulating at least one actuator 1c for moving deflection roller 1a, 1b of first conveyor belt 1 on the inlet side and/or on the outlet-side for individual food products LP to individual alignment positions 5.

In alignment position 5 of first conveyor belt 1 on the outlet side, respective food product LP may be aligned centrally with respect to substrate placement device 3 and/or to product substrate PU in transverse direction QR.

With at least one actuator 1c and control device 4, a transverse offset 6 of individual food products LP, which is present on the inlet side at first conveyor belt 1 or immediately upstream thereof and is defined, for example, with respect to a central target alignment of product stream PS, can then be eliminated or reduced to a predetermined extent. Alignment positions 5 moved to therefore compensate for the transverse offsets 6 on the inlet side of individual food products LP at the end of first conveyor belt 1 on the outlet side.

An apparatus of control device 4 suitable for this is possible, like for the other control functions described, in a manner known in principle by use of appropriate hardware and software and is therefore not described in detail.

Control device 4 is furthermore configured to set transport speed V1 of first conveyor belt 1, transport speed V2 of second conveyor belt 2 and advancement speed V3 of substrate placement device 3 independently of one another as well as to temporarily match them to one another in temporal synchronization.

For this purpose, first conveyor belt 1, second conveyor belt 2, and substrate placement device 3 each comprise separate drive motors (not shown) for the belt transport or the advancement. They can be, for example, servomotors.

Substrate placement device 3 may comprise a separating device 7 with which individual product substrates PU can be severed off from a strip-shaped carrier material TM provided, for example, on a roll and thus be separated.

Instead, it would also be conceivable in principle to provide product substrates PU in a magazine of substrate placement device 3 as a stack already in separated form (not shown).

It is further indicated schematically that product substrates PU are supplied from below, i.e. mainly vertically, through a gap-shaped belt transition 8 formed between deflection roller 1b of first conveyor belt 1 on the outlet side and deflection roller 2a of second conveyor belt 2 on the inlet side.

Individual product substrates PU are supplied in front of food product LP respectively transported in in such a way that the latter runs onto respective product substrates PU, as a result of which the latter is bent over by food product LP running across belt transition 8 and placed onto second conveyor belt 2 in a manner which is known in principle. As a result, product substrate PU and food product LP resting thereon can be received by second conveyor belt 2 and transported away together.

First and second conveyor belt 1, 2 and substrate placement device 3 may be controlled/regulated by control device 4 as follows:

When food products LP are aligned in transverse direction QR, i.e. orthogonally to direction of transport TR, the compensatory sideways motion of deflection roller 1b of first conveyor belt 1 on the outlet side to alignment position 5 may be completed as long as food product LP is still disposed entirely on first conveyor belt 1.

When food product LP touches associated product substrate PU and/or second conveyor belt 2 for the first time, the transverse alignment of respective food product LP is then already completed. As a result, food product LP twisting and/or undesired displacement of food product LP out of center on associated product substrate PU can be prevented.

Once food product LP that has just been aligned has completely left first conveyor belt 1, deflection roller 1b of first conveyor belt 1 on the outlet side is initially returned to a uniform starting position or moved directly to next alignment position 5 for subsequent food product LP. This also serves to achieve the most precise possible transverse alignment and central positioning of food products LP on associated product substrates PU.

To adjust the spacing, individual food products LP may be aligned with one another in the longitudinal direction LR, i.e. in or opposite to direction of transport TR, only when and in particular as soon as they have been received substantially entirely by first and/or second conveyor belt 1, 2. This prevents the longitudinal alignment, on the one hand, and the separation as well as the supply of the product substrates, on the other hand, from interfering with each other. Food products LP being received entirely is presently understood to mean that they are no longer resting on the conveyor belt or similar transport device respectively disposed immediately upstream, have therefore already left the latter entirely in terms of transport.

Advancement speed V3 of product substrates PU and transport speeds V1, V2 of first and second conveyor belts 1, 2 are matched to one another, for instance, at least from the point in time at which respective food product LP touches associated product substrate PU for the first time, by control device 4. The latter then also triggers the associated separation with a suitable time delay, i.e. the severing of individual product substrates PU from strip-shaped carrier material TM.

Transport/advancement speeds V1, V2, V3 synchronized with one another can either be constant or have a suitable speed profile.

Control device 4 triggers the separation, for example, such that product substrates PU have been severed when respective food product LP rests predominantly and in particular entirely on second conveyor belt 2 and on associated product substrate PU.

Product substrates PU may be separated at a point in time at which they are already clamped between second conveyor belt 2 and associated food product PU and can therefore be pulled by second conveyor belt 2. From this point in time, an active supply of respective product substrates PU through substrate placement device 3 is unnecessary so that product substrates PU can be separated from suitably advanced carrier material TM. As a result, the length of product substrates PU can be created in a flexible manner to match respective food products LP and/or according to special production requirements.

On the other hand, the separation may take place so early that the rear end of severed product substrate PU passes the distance between the location of the separation, i.e. for example, a blade for severing carrier material TM, and second conveyor belt 2 in good time matching the rear end of food product LP transported above. Inappropriately long product substrates PU can then be prevented.

In addition to transverse offset 6 of individual food products LP on the inlet side, for example, with regard to the central target alignment of product stream PS, a transport spacing 9 on the inlet side between individual food products LP is further detected by sensors, for example, by way of a camera 10 indicated schematically in FIG. 1, a distance sensor, or the like. Transport spacing 9 on the inlet side can also be detected on the inlet side of first conveyor belt 1.

By adapting the speed of first and/or second conveyor belt 2, a process-related non-uniform transport spacing 9 between food products LP on the inlet side is corrected to a substantially uniform transport spacing 11 on the outlet side. For this purpose, second conveyor belt 2 may be configured to transport one food product LP each so that individual food products LP can be arranged independently of one another having a uniform transport spacing 11 on the outlet side from leading food product LP in product stream PS by respectively associated speed adjustments of second conveyor belt 2.

An infeed conveyor belt 12 and a discharge conveyor belt 13 are furthermore shown by way of example and connect to first and second conveyor belts 1, 2 in a manner that is known in principle.

In order to promote separate adjustment of first conveyor belt 1 on the inlet and/or outlet side in transverse direction QR, first conveyor belt 1 can be composed, for example, of several circular belts arranged next to one another and running parallel to one another. In principle, however, first conveyor belt 1 can also comprise at least one elastic flat belt.

Transport speed V2 of second conveyor belt 2 and optionally transport speed V1 of first conveyor belt 1 can be regulated in a way that is known in principle such that transport spacings 9 on the inlet side between individual food products LP can be changed by temporarily increasing or reducing respective transport speed V1, V2. The range of possible spacing corrections for producing transport spacing 11 on the outlet side depends on the length of food products LP, the length of respective conveyor belt 1, 2, and the range of variation in its transport speed V1, V2.

Substrate placement device 3 can operate in a manner known in principle such that its advancement speed V3 is adapted to transport speeds V1, V2 of conveyor belts 1, 2 at the latest when food product LP reaches the upwardly projecting beginning (the end pointing in the direction of transport) of product substrates PU. Once product substrate PU has been received for transportation by second conveyor belt 2 and food product LP resting thereon and the desired length of product substrate PU has been reached, the latter is severed from strip-shaped carrier material TM.

Product substrate PU is there respectively supplied from below through the transverse gap formed at belt transition 8 which can be formed between first and second conveyor belts 1, 2 in a manner known in principle.

By suitable time-controlled/regulated positioning of deflection roller 1b of first conveyor belt 1 on the outlet side to individual alignment position 5, the immediately subsequent separation and supply of associated product substrates PU, and the again immediately subsequent individual speed adjustment of second conveyor belt 2, a combined processing operation can be performed for the transverse and the longitudinal alignment of food products LP relative to one another as well as their provision on product substrates PU at comparatively low equipment complexity and low susceptibility to failure in the region of a single belt transition 8 and the associated conveyor belts 1, 2 during the continuous (uninterrupted) transport of food products LP.

The invention claimed is:

1. A device for providing a product stream of mutually aligned food products on product substrates, comprising: a first conveyor belt for the supply transport and mutual transverse alignment of said food products to each other, said first conveyor belt having an inlet side and an outlet side, said first conveyor belt having a first transport speed/speed profile; a second conveyor belt that adjoins in the direction of transport at a gap-shaped belt transition and can be controlled separately at a second transport speed/speed profile for the discharge transport and mutual longitudinal alignment of said food products to each other; a substrate placement device for supplying said product substrates from below at an advancement speed through said belt transition in front of/under said food products that are respectively transported across said belt transition; and at least one actuator with which at least a first end on the outlet side of the first conveyor belt can be displaced transverse to said direction of transport to different alignment positions in order to align said food products individually with respect to said substrate placement device.

2. The device according to claim 1, wherein the at least one actuator is configured to further displace a second end on the inlet side of the first conveyor belt transverse to said direction of transport to different alignment positions in order to align said food products individually with respect to said substrate placement device.

3. The device according to claim 2 with a control device which is configured to terminate movement to said respective alignment position when said first conveyor belt is running before said respective food product touches its associated product substrate and/or or said second conveyor belt.

4. The device according to claim 2 with a control device that is configured to maintain said alignment positions at least until said food product which has each been aligned thereby has left said first conveyor belt entirely.

5. The device according to claim 1 with a control device which is configured to increase said transport speed of said first and/or second conveyor belt in an automated manner for the longitudinal alignment of said food products when and as soon as said food product has been received substantially entirely by said first conveyor belt or by way of said associated product substrate by said second conveyor belt, and/or said associated product substrate is present in a separated manner.

6. The device according to claim 1 with a control device which is configured to temporarily match said first and said second transport speeds/speed profiles of said first and said second conveyor belts and the advancement speed of said product substrate to one another for their supply and the placement of said food products.

7. The device according to claim 1, where said substrate placement device is configured to separate said product substrates from a strip-shaped carrier material, and said advancement speed of said substrate placement device can be adapted to said transport speed of said first and/or said second conveyor belt.

8. The device according to claim 7, where said substrate placement device is configured to sever said product substrates as long as said respectively associated food products are not yet resting entirely on said second conveyor belt.

9. A method for providing a product stream of mutually aligned food products on product substrate, where said food products are transported in on a first conveyor belt and are aligned relative to one another in a transverse direction by mechanical adjustment of at least one deflection roller of said first conveyor belt, where said product substrate is supplied from below at an end of said first conveyor belt on an outlet side at an advancement speed and said food products are received and transported away by way of said supplied product substrate by a second conveyor belt adjoining in a direction of transport, and where said food products are aligned relative to one another in a longitudinal direction by adjusting a transport speed of said first and/or said second conveyor belt.

10. The method according to claim 9, where said food products are aligned during their transport by the mechanical adjustment of said end of said first conveyor belt on the inlet side and/or said end on the outlet-side transverse to said direction of transport to individual alignment positions with respect to said supplied product substrates before said food products touch said product substrates and/or said second conveyor belt.

11. The method according to claim 10, wherein said alignment positions of said end on the outlet side individually assumed for said individual food products are each maintained at least until said associated food product has left said first conveyor belt entirely.

12. The method according to claim 10, where transverse offsets and transport spacings of said food products on the inlet side to be corrected are detected by sensors upstream of said first conveyor belt and/or at its beginning and are compensated for or equalized by way of said first and said second conveyor belt.

13. The method according to claim 9, where said transport speeds of said first and/or said second conveyor belt for the longitudinal alignment/spacing adjustment of said food products are aligned mechanically when and as soon as said respective food product has been received entirely for transport by said first conveyor belt or by way of said associated product substrate by said second conveyor belt, and/or said associated product substrate is present in a separated manner.

14. The method according to claim 9, where said transport speeds of said first and said second conveyor belt and said advancement speed of said product substrate are matched to one another temporarily for their supply.

15. The method according to claim 9, where said product substrates made of a strip-shaped carrier material are separated below said first and/or said second conveyor belt.

16. The method according to claim 15, where said product substrates are severed from said strip-shaped carrier material before said respectively associated food products rest substantially entirely on said second conveyor belt.

17. The method according to claim 15, where said product substrates are supplied in a manner that is speed-synchronous with the second conveyor belt.

\* \* \* \* \*